United States Patent [19]
Sacks

[11] Patent Number: 6,040,008
[45] Date of Patent: Mar. 21, 2000

[54] SILICON CARBIDE FIBERS WITH BORON NITRIDE COATINGS

[75] Inventor: Michael D. Sacks, Gainesville, Fla.

[73] Assignee: University of Florida, Gainesville, Fla.

[21] Appl. No.: 09/082,869

[22] Filed: May 21, 1998

Related U.S. Application Data

[60] Provisional application No. 60/055,424, Aug. 4, 1997.

[51] Int. Cl.[7] ............................... B05D 3/02; B05D 3/04
[52] U.S. Cl. ................... 427/226; 427/227; 427/255.26; 427/225.4; 427/376.1; 427/399
[58] Field of Search ...................................... 427/226, 227, 427/376.1, 255.4, 255.12, 255.26, 399

[56] References Cited

U.S. PATENT DOCUMENTS

| | | | |
|---|---|---|---|
| 4,196,233 | 4/1980 | Bitzer et al. | 427/249 |
| 4,605,588 | 8/1986 | Simpson et al. | 428/288 |
| 4,642,271 | 2/1987 | Rice | 428/698 |
| 5,292,830 | 3/1994 | Funayama et al. | 525/478 |
| 5,354,602 | 10/1994 | Stranford et al. | 428/220 |
| 5,792,416 | 8/1998 | Sacks et al. | 264/625 |

*Primary Examiner*—Shrive Beck
*Assistant Examiner*—Michael Barr
*Attorney, Agent, or Firm*—Thomas C. Saitta

[57] ABSTRACT

A process for forming a uniform, boron nitride coating on a boron-doped, refractory carbide body, and in particular on a sintered, boron-doped, silicon carbide fiber, where the body is exposed to a nitrogen-containing atmosphere at a temperature equal to or greater than the densification or sintering temperature. The coated fibers exhibit no loss in strength properties and show improved creep resistance.

24 Claims, 9 Drawing Sheets

SILICON CARBIDE FIBERS WITH BORON NITRIDE COATINGS

This application claims the benefit of U.S. Provisional Application No. 60/055,424, filed Aug. 4, 1997.

This invention was made with government support under grant/contract number F49620-94-1-0429 awarded by the Air Force Office of Scientific Research. The government has certain rights in the invention.

BACKGROUND OF THE INVENTION

This invention concerns an inexpensive method for producing high-strength silicon carbide (SiC) fibers with uniform boron nitride (BN) coatings and improved creep resistance. The process defined herein will produce BN coatings on boron-doped SiC bodies or fibers originally formed by various known processes, such as by sintering, chemical vapor deposition, etc.

Silicon carbide is a material with excellent mechanical properties at high temperatures. SiC fibers are of great interest for the fabrication of composite materials, especially composite materials for use in high temperature structural applications. Composite materials generally consist of three components: a reinforcement phase, a matrix phase, and an interface phase (i.e., a phase between the reinforcement and the matrix phases). Each phase is of critical importance in determining the properties of the composite. High-strength fibers are a common reinforcing phase. The fibers are usually coated with the interface phase prior to being consolidated with the matrix to form the overall composite. However, processes for the coating of fibers are usually expensive. In addition, many processes do not provide uniform coatings of the interphase phase over the entire surface of the fibers. Non-uniform coatings adversely affect the thermomechanical properties of the composite.

In ceramic-matrix and glass-matrix composites prepared with SiC fibers, very common interface materials include carbon (C) and boron nitride (BN). Fibers are usually coated with these interface materials by chemical vapor deposition (CVD) methods. However, CVD methods for depositing BN coatings on SiC fibers are usually very expensive. In addition, the CVD methods often do not give coatings with good uniformity, particularly for fine-diameter fibers that comprise multifilament fiber tows.

It is also possible to deposit coatings on fibers by pulling the fibers through liquid solutions or sols which contain precursors to the desired coating phase either in a dissolved form or a fine particulate form. These precursors usually need to be heat treated in an appropriate temperature range in order to be converted to the desired coating phase. However, liquid solution or sol methods may be expensive, the uniformity of the coatings formed is often poor, especially for multifilament fiber tows, and it can be difficult to form dense, non-porous, crack-free coatings, especially with coatings prepared from fine particulate sols.

In this invention, it was unexpectedly discovered that boron-doped SiC fibers with high relative density can be heat treated in a nitrogen-containing atmosphere, at a temperature which is the same or higher than the temperature used to originally sinter the fibers, to develop a BN layer at the SiC fiber surface. Surprisingly, BN-coated SiC fibers prepared in this manner still retain high tensile strengths, i.e., strengths that are approximately the same as the original uncoated SiC fibers. Furthermore the BN coated SiC fibers prepared in this manner have improved creep resistance compared to the original uncoated SiC fibers.

This invention is a low-cost method for forming BN coatings on SiC fibers. The cost is low because the BN coatings are formed on the fiber in-situ by a simple heat treatment in which the surrounding inexpensive nitrogen atmosphere reacts with a constituent which is already within the fiber. In contrast, other methods are more complicated. CVD methods, for example, require careful control over processing conditions involving two or more gaseous species in order to form stoichiometric BN and to deposit it such that the coating is reasonably smooth and uniformly distributed. Liquid solution or sol methods require more complicated steps of synthesis, deposition, and subsequent decomposition of suitable precursors. Another very important cost benefit of the current invention is that it allows the fiber production and fiber coating steps to be combined into a single fabrication process.

The method of this invention can also be applied to the development of low-cost boron nitride coatings on other SiC carbide ceramics, i.e., SiC substrates, surface coatings, bulk shapes, etc. In addition, the process is expected to be applicable to forming BN coatings on other refractory carbides fibers or refractory carbide bodies which are doped with boron. This would include, but not be limited to, titanium carbide (TiC), hafnium carbide (HfC), tantalum carbide (TaC), molybdenum carbide (MoC), zirconium carbide (ZrC), etc. which are doped with boron.

There are many methods of forming SiC ceramics. SiC ceramics are often prepared by forming and consolidating fine SiC particles into a desired shape and subsequently heat treating (i.e., sintering) the "green" shape in order to eliminate the interparticle pores or void space and to obtain a high-strength body with high relative density having little or no residual porosity. SiC ceramics are also prepared by other methods, especially by chemical vapor deposition (CVD) and by heat treatment of organosilicon polymers. For example, organosilicon polymers have been used to prepare fine SiC particles, fibers, bulk samples, coatings, etc. Some samples prepared using organosilicon polymers develop fine SiC crystallites and fine pores during processing and a sintering step is required to produce a dense SiC sample. The last step is carried out in a similar manner as in conventional powder processing methods, except that lower sintering temperatures are usually needed because the size of the SiC particles or crystallites and of the pores are usually considerably smaller.

It is well known that SiC ceramics with high relative density and fine grain sizes are desirable in order to attain excellent mechanical properties. However, it is very difficult to prepare pure SiC with high relative density and fine grain sizes by sintering methods, especially by pressureless sintering methods. In samples comprised of fine particles or fine crystallites, pure SiC generally undergoes growth of particles and pores during high temperature heat treatment because of the dominance of surface diffusion and/or vapor phase diffusion processes. Thus, very little densification occurs in pure SiC during high temperature heat treatment. As a result of this problem, sintering aids are almost always used to enhance the densification (and prevent coarsening) during sintering and, thereby, allow the fabrication of SiC with high relative density and fine grain sizes. Several additives have been found effective as sintering aids for SiC, but boron-containing compounds are the most commonly used additives. Varying amounts of boron compounds have been reported as effective for sintering (e.g., 0.2–5 wt %), but boron concentrations on the order of approximately 0.5–1 wt % are most common.

The typical sintering temperatures for preparing dense SiC are in the range of approximately 1700–2300° C. The required temperature is highly dependent upon the size of the SiC particles or crystallites which comprise the porous body that is being sintered. For example, SiC bodies fabricated from the more conventional powder processing routes generally require higher sintering temperatures (typically from 1900–2300° C.) and this results in sintered bodies comprised of coarser grain sizes (greater than 1 micron). In contrast, organosilicon polymer-derived SiC bodies such as fibers can be sintered at lower temperatures (e.g., approximately 1700–1900° C.) and, consequently, the resulting grain sizes are usually smaller (less than 1 micron).

In addition to controlling the sintering temperature and using the proper amount and type of sintering additive, it is also important to control the gas atmosphere during sintering of SiC in order to achieve high relative density and fine grain size. It is well known that oxidizing atmospheres are undesirable, while atmospheres which are usually referred to as inert or chemically inert are desirable. Argon is the most common atmosphere used in sintering of SiC. Helium, nitrogen, and a vacuum have also been widely reported as useful gas atmospheres for sintering of SiC.

As described in more detail below, there have been several prior studies in which SiC was fabricated using a boron compound as a sintering aid and nitrogen as the sintering atmosphere. However, it has not been reported in the prior art that high-strength SiC samples with uniform BN coatings can be formed by heat treating boron-doped SiC in a nitrogen-containing atmosphere. The prior art teaches either that boron-doped SiC is chemically inert during heat treatment in a nitrogen-containing atmosphere or, in some cases, that silicon nitride may be formed from heat treatment in a nitrogen-containing atmosphere. In contrast, this invention teaches that BN coatings can be formed when boron-doped SiC is heat treated at temperatures higher than that required for sintering and densification. In the prior art, heat treatments in nitrogen-containing atmospheres are only carried out at the sintering temperatures. Furthermore, the prior art specifically teaches against heat treating SiC at temperatures above that required for the purposes of sintering densification. According to the prior art, this will result in a loss of strength of the SiC body. In contrast, the current invention teaches the surprising result that high strengths can be maintained in samples which are heat treated in a nitrogen-containing atmosphere at temperatures higher than the sintering temperature.

One of the earliest uses of boron sintering additives was for processing SiC shapes by hot pressing or pressureless sintering of SiC powders. Prochazka in U.S. Pat. Nos. 3,853,566, 3,960,577, 3,954,483, 3,968,194, and 4,004,934 reported that small amounts of boron, especially when combined with small amounts of carbon, could be used to enhance densification and produce SiC bulk samples with high densities and fine grain sizes. Boron was incorporated by mixing SiC powders with boron-containing powders such as elemental boron, boron carbide, and boron nitride. It was also reported that gaseous boron trichloride could be used to vapor-phase dope boron directly into SiC powders during their synthesis by CVD methods. The minimum amount of boron needed for good densification was approximately 0.3 wt %, although higher amounts were generally used.

Prochazka and many others researchers concluded that it is desirable to use the lowest possible temperature and shortest possible time that are needed to accomplish densification during sintering of SiC. This is not only because of the cost savings, but also because prolonged heat treatment results in grain growth in the sintered body. Grain growth is considered undesirable in many cases because it usually results in a reduction in the strength of the sintered body. For example, in U.S. Pat. No. 4,004,934, Prochazka states: "An extended dwell [time] at high temperature is harmful because it brings about coarsening of the microstructure and consequently degradation of the mechanical properties. Thus, the shortest hold [at the sintering temperature] is preferable." Because Prochazka used powder processing methods, sintering and hot pressing temperatures were generally in the range of approximately 1900–2100° C., with the lower temperatures in this range being used for samples which were hot pressed.

From U.S. Pat. Nos. 3,853,566, 3,960,577, 3,954,483, 3,968,194, and 4,004,934, it is reported that boron-doped SiC bodies can be sintered to high relative density using several different gas atmospheres, including argon, helium, nitrogen. In the first claim of U.S. Pat. No. 4,004,934, it is stated that a dense boron-doped SiC ceramic can be made by "sintering of the green body in an inert atmosphere chemically-inert with respect to silicon carbide at atmospheric pressure or below atmospheric pressure at a temperature of about 1900–2100° C. . . . " A nitrogen atmosphere was used in most of the examples in U.S. Pat. No. 4,004,934, so this patent teaches that SiC is chemically-inert in nitrogen. It is also stated in U.S. Pat. No. 3,853,566 that during hot pressing an atmosphere must be used which is inert to the silicon carbide and that useful inert atmospheres including argon, helium, and nitrogen.

Other studies in which boron-doped SiC is sintered in a nitrogen-containing atmosphere have been reported. In each case, the prior art teaches that the nitrogen atmosphere should be used at the lowest temperature required for densification. For example, Urasato et al. in U.S. Pat. No. 5,011,639 sintered green bodies prepared with SiC powders which had been mixed with approximately 0.2–5.0 wt % of boron powder or a boron compound powder (e.g., boron carbide, boron oxide, titanium diboride). In this case, nitrogen was not considered an inert gas. The patent states that green bodies were ". . . sintered in an atmosphere of an inert gas containing nitrogen in a minor concentration. The inert gas here implied is a rare gas such as helium, argon, and the like. The concentration of nitrogen in the atmosphere of mainly the inert gas should be in the range from 0.005 to 5% by volume or, preferably, from 0.01 to 2% by volume." It is stated that the furnace for sintering should be filled with nitrogen-containing inert gas throughout the sintering procedure. In addition, it is stated that "[t]he temperature of sintering should be in the range of 1800 to 2200° C. or, preferably, from 1950 to 2150° C. When the temperature for sintering is too low, the green body cannot be fully sintered so that the sintered body would have somewhat decreased density. When the temperature of sintering is too high, on the other hand, undue grain growth and thermal decomposition of silicon carbide may take place so that the sintered body has a decreased electric resistivity and mechanical strength."

Boron-doped SiC bodies with high relative density have also been formed using mixtures of SiC particles and borosiloxane polymers. This was demonstrated by Burns et al. in U.S. Pat. No. 5,112,779 using sintering temperatures in the range of 2000–2200° C. to achieve densification. Nitrogen was considered an inert atmosphere suitable for sintering. It was stated that "Inert atmospheres are used for sintering. . . . For the purposes of this invention, an inert atmosphere is meant to include an inert gas, vacuum, or both. If an inert gas is used it may be, for example, argon, helium, or nitrogen."

Powder processing methods can be used to form SiC fibers, especially fibers with larger diameter (i.e., greater than 25 microns). Frechette et al. in U.S. Pat. No. 4,908,340 and in Ceram. Eng. Sci. Proc. 12[7–8] 992–1006, 1991 (by F. Frechette, B. Dover, V. Venkateswaran, and J. Kim) prepared SiC fibers by either melt spinning or dry spinning of mixtures of SiC particles and organic polymers. Boron was incorporated in the fibers by adding 0.2–1.0 wt % boron carbide powders to the spinning mixtures. Some fibers were heat treated in crucibles which had been coated with slurries containing boron carbide in order to form boron-containing gases during the sintering operation. SiC fibers were sintered at temperatures in the range of 1900–2150° C. in an argon atmosphere or at 2300° C. in a nitrogen atmosphere in order to obtain substantially dense fibers. It is reported in U.S. Pat. Nos. 4,004,934 and 4,908,340 and elsewhere that higher sintering temperatures are required for densification when nitrogen is used as the sintering atmosphere.

Bolt et al. in U.S. Pat. No. 4,942,011 prepared SiC fibers by spinning mixtures of SiC particles and organosilicon polymers. One of the sintering aids used was boron carbide. The concentration of the sintering aids was 0.2–5% based on the SiC weight. Fibers were sintered at temperatures in the range of 1900–2000° C. in an argon atmosphere, although it was indicated that inert or reducing atmospheres could be used.

Birchall and Clegg in U.S. Pat. No. 5,063,107 prepared SiC fibers in a similar manner to Frechette et al. and Bolt et al. They used mixtures of SiC particles and organic polymers. They also utilized known sintering aids, such as boron. Sintering was carried out at 2040° C. for 20 min in an argon atmosphere. It was stated in the patent that "The later stage of the process of the invention will generally be effected in an inert atmosphere by which we mean in an atmosphere which is unreactive with the silicon carbide at the temperature of heating." It is also stated that "It may also be necessary to avoid the use of nitrogen as nitrogen may react with the silicon carbide to produce silicon nitride."

Organosilicon polymers are the generally the preferred material for fabricating SiC fibers with fine diameters (i.e., less than approximately 25 microns). Yajima et al. in U.S. Pat. Nos. 4,052,430, 4,100,233, 4,220,600, and 4,283,376 developed processes for preparing polycarbosilane polymers and SiC-based fibers from polycarbosilane polymers. The processes developed by Yajima et al. are the basis for NICALON™ fibers which are manufactured by Nippon Carbon Co., Ltd. A similar commercial process involves using a titanium metal-modified polycarbosilane (i.e., a polytitanocarbosilane) polymer and is the basis for TYRANNO™ fibers which are manufactured by Ube Industries Ltd. Yajima et al., in some of the earlier cited patents and in U.S. Pat. No. 4,152,509, also reported that SiC fibers could be prepared from polycarbosilane polymers which were synthesized from a polysilane and a phenyl-containing polyborosiloxane. A typical method for synthesis of the boron-containing polymers (i.e., phenyl-containing polyborosiloxane polymers) involved reacting boric acid with a diphenylchlorosilane, although other reactants were also reported. The organosilicon polymer fibers produced by the various methods of Yajima et al. were pyrolytically decomposed to SiC-based fibers by heat treatment at temperatures usually below about 1300° C. Pyrolysis was usually carried in nitrogen or argon atmospheres or under vacuum. The fibers produced by these methods do not have good thermomechanical stability. The fibers degrade extensively and become extremely weak when heat treated at temperatures above approximately 1200–1400° C. This is because of carbothermal reduction reactions that occur as a result of large amounts of oxygen and excess carbon in the SiC fibers.

Wallace et al. in U.S. Pat. No. 5,139,871 reported that the thermomechanical stability of organosilicon polymer-derived SiC fibers, such as TYRANNO™ fibers, can be improved by certain heat treatments in a nitrogen atmosphere. It was specified that heat treatments could be carried out between 800–1800° C., with a preferred range of 1100–1600° C. It was shown that heat treatments in a nitrogen atmosphere alone did not result in any improvement in the thermomechanical properties of the fibers. However, a small improvement in the thermomechanical properties of the fibers was observed when the fibers were placed in intimate contact with carbon particles during the heat treatment in nitrogen. Nevertheless, the fibers still had low strengths (i.e., less than 1.5 GPa) after heat treatment at only 1600° C.

Other methods have been reported for introducing boron into organosilicon polymers and using such polymers to prepare SiC-based fibers. Takamizawa et al. in U.S. Pat. No. 4,604,367 prepared SiC-based fibers which contained boron by using organoborosilicon polymers. These polymers were prepared by reacting an organopolysilane with an organoborazine compound, such as B-trimethyl-N-triphenyl borazine, B-trivinyl-N-triphenyl borazine, and B-triamino-N-triphenyl borazine. The organoborosilicon polymers were melt spun into green fibers which were infusibilized by oxidative or irradiative cross-linking methods and subsequently pyrolyzed to form SiC-based fiber containing boron and nitrogen. Although Takamizawa et al. indicated that heat treatments could be carried out at temperatures up to 1800° C., the preferred heat treatment temperatures were less than about 1600° C. Nitrogen was considered a suitable gas for the pyrolysis process. The resulting fibers showed better strength retention upon high temperature heat treatments compared to NICALON™ fibers, but the fibers still started to show decreased strengths after heat treatments at temperatures above approximately 1100–1200° C. and the strengths were too low for the fibers to be useful at temperatures above approximately 1500–1600° C.

Researchers at Dow Corning have reported, in U.S. Pat. Nos. 5,071,600, 5,162,269, 5,167,881, 5,268,336, 5,279, 780, and 5,366,943 the fabrication of boron-doped, low-oxygen-content SiC fibers with carbon-rich or near-stoichiometric composition which were prepared based on using several organosilicon polymers (i.e., polycarbosilane, methylpolydisilylazane, polyorganosiloxane). In U.S. Pat. Nos. 5,071,600 and 5,162,269, for example, fibers were formed by melt spinning of low-molecular-weight polycarbosilane. Fibers were oxidatively cured to prevent melting of the fibers during subsequent heat treatment. The primary modification of the process of Yajima et al. was to incorporate sufficient amounts of boron (greater than 0.2 wt %) in the fibers so that high relative density and fine grain sizes could be obtained after sintering. The patents describe mostly gas-phase doping methods in which it was indicated that boron-containing compounds (e.g., diborane, boron trifluoride, boron tribromide, boron trichloride, tetraborane, pentaborane, borazine, trichloroborazine) could be infiltrated into the fibers at temperatures in which the compounds were in the form of gases. The boron-containing gas could be introduced at various stages in the fiber fabrication process, but it must be present prior to the onset of sintering in order to prevent grain coarsening and to allow densification of the porous SiC fibers to occur. The fibers develop porosity after a high temperature pyrolysis process which typically occurs in the range of approximately 1200–1600° C., i.e., below the required sintering temperature. In addition to gas phase doping, the Dow Corning patents also describe instances in which the organosilicon polymers were synthesized such that they contained some boron.

The fibers produced according to the methods described in the Dow Corning patents are known as SYLRAMIC™ fibers. These fibers had thermomechanical stability which is much better than NICALON™ and TYRANNO™ fibers. The properties are similar to HI-NICALON TYPE S™ fibers which is produced by Nippon Carbon Co. According to Lipowitz et al. (Ceram. Eng. Sci. Proc., 16[4] 55–62, 1995), the SYLRAMIC™ fibers retained 96% of their original tensile strength after heat treatment at 1550° C. for 10 hours in an argon atmosphere. The fibers retained 74% of their original tensile strength after heat treatment at 1800° C. for 12 hours in an argon atmosphere.

The Dow Corning patents indicate that oxygen, nitrogen, and excess carbon are eliminated from fibers as gaseous volatiles during the high temperature pyrolysis stage which occurs in the range of approximately 1200–1600° C. This process results in fibers with fine pores and fine grains. The porosity is removed by sintering at a temperature typically in the range of 1800–1850° C. Boron must be present to prevent grain coarsening and allow pore removal to occur. The Dow Corning patents teach against the use of nitrogen atmospheres for the high temperature processing steps. In U.S. Pat. No. 5,167,881, it is stated that "[a]t pyrolysis temperatures above about 1400° C., nitrogen-containing atmospheres are not preferred as nitrogen is not inert to the fibers under those temperature conditions. At high temperatures, truly inert gaseous atmospheres are preferred such as argon and/or helium." A similar statement is made in U.S. Pat. No. 5,268,336. It should be noted that the patents use the term "pyrolysis" to encompass not only the process in which volatiles are removed at lower temperatures, but also the higher temperature sintering process. The fibers produced in the Dow Corning patents do not contain any nitrogen and, hence, do not contain any boron nitride coating. The first claim in U.S. Pat. No. 5,162,269 states that the fibers are "nitrogen-free." In U.S. Pat. No. 5,268,336, it is stated "[t]he duration of the pyrolysis treatment should be sufficient to eliminate substantially all oxygen and/or nitrogen from the fibers."

Sacks et al. in U.S. patent application Ser. No. 08/683,475 U.S. Pat. No. 5,712,416 reported the fabrication of boron-doped, low-oxygen-content SiC fibers with near-stoichiometric composition, high relative density, and high tensile strength which were prepared using high-molecular-weight polycarbosilane polymers. Fibers were sintered in an argon atmosphere. In most examples, the fibers were sintered in the range of 1750–1800° C. for 1 hour. If fibers were sintered at higher temperatures, shorter sintering times were used to produce fibers with high relative density and high strength. For example, sintering times were 12 and 2 minutes when sintering temperatures were 1845 and 1890° C., respectively. Sintered SiC fibers produced by this method had an average tensile strength of approximately 2.85 GPa. The fibers typically retained more than 90% of the original tensile strength after being re-heated in an argon atmosphere at 1800° C. for 4 hours. However, the tensile strength decreased to approximately 75% of the original strength after heat treatment in argon at 1950° C. for 1 hour. Hende, heat treatments in an argon atmosphere which were carried out at higher temperatures or longer times than needed for sintering resulted in decreased tensile strengths of the fibers. A similar observation was reported by Takeda et al. (Ceram. Eng. Sci. Proc., 17[4] 35–42, 1996) for HI-NICALON TYPE S™ fibers produced by Nippon Carbon Co. As-prepared HI-NICALON TYPE ST™ fibers had high relative density, low oxygen content, and near-stoichiometric composition. These fibers were given re-heat treatments at temperatures up to 1900° C. for 10 hours. The fiber tensile strengths decreased with increasing heat treatment temperature, reaching values below 1 GPa for the longest heat treatment carried out at the highest temperature. X-ray diffraction line broadening measurements showed that the SIC crystallite sizes increased as the re-heat treatment temperature increased. Hence, the decrease in tensile strength was attributed to the increased grain sizes.

For high temperature applications, it would be desirable to have SiC fibers with high strength and high resistance to creep. As discussed by DiCarlo (in Composites Science and Technology, 51 213–222, 1994), it is difficult to achieve both of these properties simultaneously in SiC fibers. The strength of SiC fibers is controlled by "flaws" (e.g., voids, particulate impurities, kinks, grains, etc.). When other flaws are avoided through careful processing, the strength is controlled by the size of the SiC grains comprising the fibers. Hence, it is generally observed that carefully processed organosilicon polymer-derived SiC fibers have much better strength compared to powder-derived SiC fibers because the grain sizes are much smaller. The tensile strengths for organosilicon polymer-derived SiC fibers are typically in the range of ~2.0–3.5 GPa. (Fiber tensile strengths>2 GPa are desirable for the development of high-strength, fiber-reinforced composites.) In contrast, the tensile strengths for powder-derived SiC fibers are usually much lower, e.g., ~0.5–1.5 GPa.

The creep resistance of SiC fibers is usually highly dependent upon grain size also. However, the effect of grain size on creep behavior is the opposite of its effect on strength. The creep resistance increases as the grain sizes increases. Hence, powder-derived SiC fibers usually show better creep resistance than polymer-derived SiC fibers. Thus, it has not been possible in the past to make SiC fibers with both high tensile strength and high creep resistance. The difficulty in simultaneously achieving high tensile strength and high creep resistance in SiC fibers was demonstrated by Takeda et al. (in Ceram. Eng. Sci. Proc., 17[4] 35–42, 1996) using the organosilicon polymer-derived fibers known as HI-NICALON TYPE S™ which are produced by Nippon Carbon Co. As-prepared HI-NICALON TYPE S™ fibers have an overall composition close to that of stoichiometric SiC, low-oxygen-content (<0.2 wt %), high tensile strength (~3 GPa), and fine diameter (12 $\mu$m). As noted earlier, Takeda et al. heat treated these fibers at temperatures up to 1900° C. for 10 hours in an argon atmosphere and the fiber tensile strengths decreased with increasing heat treatment temperature, reaching values below 1 GPa for the longest heat treatment carried out at the highest temperature. The creep behavior of the SiC fibers was assessed using a bend stress relaxation (BSR) test. In contrast to the strength behavior, the creep resistance of the fibers increased as the grain size increased. Fibers given the longest heat treatment carried out at the highest temperature showed the best creep resistance, as assessed by the BSR test. Heat treatments of the organosilicon polymer-derived HI-NICALON TYPE S™ fibers at the highest temperature and longest time resulted in fibers that were similar to powder-derived fibers in terms of good creep resistance and low strength values. This combination was observed because the heat treatments resulted in fibers with relatively large grain sizes.

SUMMARY OF THE INVENTION

The invention is a heat treatment process for forming a uniform, boron nitride (BN) coating on a boron-doped, refractory carbide body, and in particular on a sintered, boron-doped, silicon carbide (SiC) fiber, which does not reduce the high strength properties of the original fiber. The fiber or body is exposed to a nitrogen-containing atmosphere at a temperature equal to or greater than the sintering temperature, and most preferably about 50 to 150 degrees C. above the sintering temperature, for a period of time sufficient to develop the BN coating of desired thickness. The BN-coated fibers maintain similar strength properties as the original, non-coated fibers, while exhibiting improved creep resistance.

DETAILED DESCRIPTION OF THE INVENTION

Figure 1:
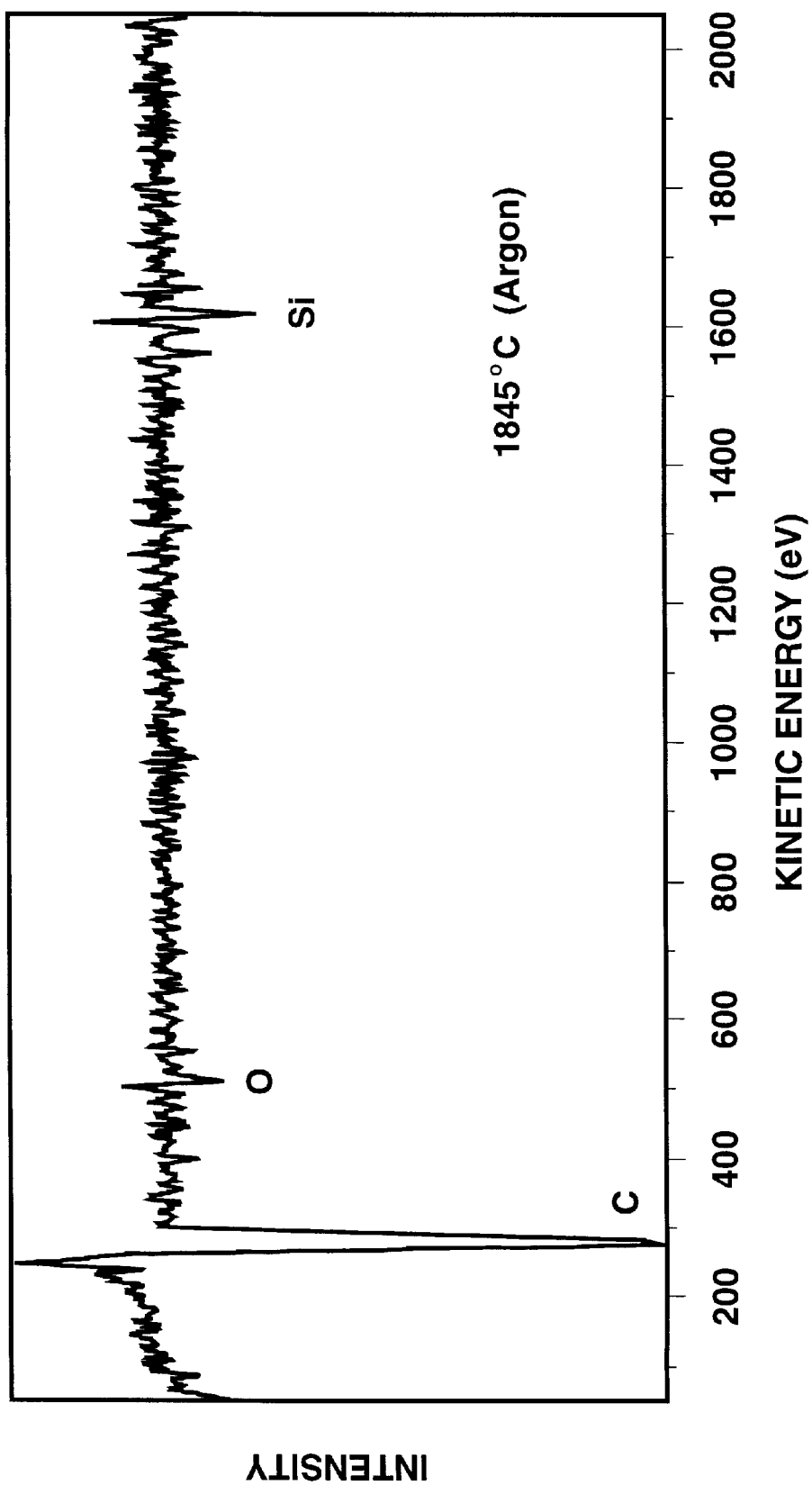
FIG. 1 shows an AES spectrum for the control (uncoated) SiC fiber sample from Example 1 which was heat treated at 1845° C. for 12 minutes in argon.

With regard for the best mode. and preferred embodiment, the invention will now be described in detail. SiC fibers with high relative density (i.e., little or no porosity) which contain boron can be heat treated in a nitrogen-containing atmosphere to develop a boron nitride (BN) layer or coating at the SiC fiber surface. For SiC, the relative density is considered to be high when the bulk density is greater than about 3.0 grams per cubic centimeter and the SiC fibers produced in this invention have typical bulk density values in the range of approximately 3.1 to 3.2 grams per cubic centimeter (the upper value is very close to the true solid density of high-purity, fully dense SiC). The BN-coated SiC fibers have approximately the same high tensile strength as the original uncoated SiC fibers and improved creep resistance.

While primarily addressing boron-doped SiC fibers, the coating process is also applicable to boron-doped SiC bodies, and also to other refractory carbides fibers or refractory carbide bodies which are doped with boron, such as for example, titanium carbide (TiC), hafnium carbide (HfC), tantalum carbide (TaC), molybdenum carbide (MoC), zirconium carbide (ZrC), etc. The process will produce BN coatings on non-sintered, boron-doped, SiC or other refractory carbide bodies or fibers as well, such as those produced by chemical vapor deposition or other methods, in which case the non-sintered bodies are treated in a nitrogen-containing atmosphere at an elevated temperature sufficient to produce the BN coating, typically approximately between 1750 and 2250 degrees C.

The initial processing steps for preparing the SiC fibers in this invention were the same as in U.S. patent application Ser. No. 08/683,475, U.S. Pat. No. 5,792,416 by Sacks et al., incorporated here by reference. This includes the following steps: (i) Polycarbosilane (PCS) polymer is synthesized by pressure pyrolysis of polydimethylsilane (PDMS). The average molecular weight for the PCS is typically in the range of approximately 7,000–16,000. (ii) A concentrated fiber-spinning solution or spin dope is prepared using PCS, one or more solvents (e.g., toluene), one of more spinning aids (e.g., polysiloxane (PSO), polysilazane (PSZ)), and a boron-containing sintering aid (e.g., solid boron hydride). The typical range of polymer concentrations are from approximately 60 to 75% and the typical spin dope viscosities are in the range of approximately 10 to 100 Pa.s. (iii) Fibers are formed by extruding the spin dope through a spinneret and collecting the extruded filaments on a winding wheel. (iv) The green, as-collected, fibers are heat treated using oxidizing and nonoxidizing atmospheres to accomplish removal of solvent and incorporation of oxygen (less than about 300° C.), pyrolytic decomposition of the organosilicon polymer (less than about 1200° C.), carbothermic reduction reactions which remove excess carbon and oxygen (less than about 1650° C.), and sintering to densify the fiber (less than about 2000° C.). In the last of these initial processing steps, the fibers are heat treated in an inert gas atmosphere, such as in argon gas, in order to produce a fiber with high relative density. In the present invention, additional processing steps are used. In particular, the sintered fibers are heat treated in a nitrogen gas-containing atmosphere.

The heat treatment in a nitrogen gas-containing atmosphere is carried out at higher temperatures and/or longer times than required for densification. It should be emphasized that the heat treatment in the nitrogen-containing atmosphere is not carried out during the process of sintering the SiC fibers. As described in detail earlier, it is well-known that nitrogen has been used as the atmosphere for sintering of SiC fibers and other SiC bodies. The present invention differs in that the heat treatment in the nitrogen-containing atmosphere occurs after the sintering densification process is completed and at a higher temperature and/or longer time than that used for sintering.

In the boron-doped SiC fibers, the boron may be dissolved in the SiC lattice and/or may be present as boron-containing second-phase precipitates. BN coatings do not form at the surface of the SiC fibers during the densification process, presumably because the temperatures for reaction are too low. However, at higher temperatures than required for sintering and/or much longer times at the sintering temperature, it is believed that the nitrogen in the furnace atmosphere during the post-sintering heat treatment can react with boron at and near the SiC surface according to a reaction such as:

$$N_{2(g)} + 2B_{(s)} = 2BN_{(s)}$$

The continued formation of BN after the initial reaction at the surface would require chemical interdiffusion of B and N through the BN surface layer. At sufficiently high temperatures, such interdiffusion will occur and additional BN will form at the fiber surface. Typical thicknesses of the BN layers fabricated in this invention are in the range of approximately 25–250 nm (0.025–0.25 microns). However, thinner or thicker layers could be prepared if some of the processing variables are altered, such as the heat treatment time and temperature, the percentage of nitrogen gas in the gas atmosphere during heat treatment, the pressure of the nitrogen gas during the heat treatment, and the boron content in the fiber.

The method of this invention is well-suited for the development of coatings which are uniform over all the surfaces. This is because one of the reactants (i.e., boron) is initially present homogeneously throughout the fibers. Furthermore, the other reactant is a gas (i.e., nitrogen) which uniformly envelopes or surrounds the entire area of the SiC fiber surfaces during the heat treatments.

This invention may be practiced such that all the heat treatments can be carried out together as part of a combined process for fabricating the fibers, i.e., it is not necessary to remove the fibers from the furnace each time the heat treatment involves a different gas atmosphere and/or temperature. The atmospheres and temperatures in the furnace can simply be changed in a sequential fashion during one continuous furnace run. Thus, it is not necessary to carry out distinct and separate furnace heat treatments for fiber fabrication and fiber coating.

Alternatively, the heat treatments needed to produce the BN coatings can be carried out on pre-existing boron-doped SiC fibers. Hence, the method could be applied to improve the properties of pre-existing fibers such as SYLRAMIC™ fibers produced by Dow Corning Corp. and any other appropriate commercially-produced or developmental SiC fiber.

The process is demonstrated in the examples below for SiC fibers prepared by dry spinning of polycarbosilane-based polymers, but it is evident that the process can be applied to other boron-doped SiC fiber fabrication processes, including polymer-derived fiber fabrication processes based on melt spinning, wet spinning, or dry spinning other organosilicon pre-ceramic polymers; powder-derived fiber processes; and vapor-phase-derived fiber processes. Furthermore, the process could also be applied to develop BN coatings on the surfaces of other boron-containing SiC ceramics, including bulk samples, substrates, coatings, etc. Furthermore, the process could also be applied to develop BN coatings on the surfaces of other boron-doped carbide ceramics which are sufficiently refractory to be heat treated at elevated temperatures in a nitrogen-containing atmosphere.

Two types of measurements were carried out to demonstrate the simultaneous development of high strength and high creep resistance in the SiC fibers produced in this invention: (i) tensile strength tests and (ii) Morscher-DiCarlo bend stress relaxation (BSR) tests. The tensile strength measurements were carried out according to the ASTM (American Society for Testing and Measurements) procedure D3379. The BSR tests were carried out using the method developed by Morscher and DiCarlo (J. Am. Ceram. Soc., 75[1] 136–140 1992). This test involves subjecting the fiber to heat treatment under a fixed stress and then determining a stress relaxation ratio, designated as the "M" value. This value is considered to be a measure of creep resistance of the fiber. It depends on the various testing conditions (the time/temperature schedule using during heat treatment, the stress on the fibers duringy heat treatment, etc.) and the fiber characteristics. M takes on values between 0 and 1. For a given stress and time/temperature heat treatment schedule, fibers with better creep resistance will have M values closer to 1. As will be described below, the SIC fibers in this invention show higher M values compared to other SIC fibers tested under the same conditions.

EXAMPLES

Example 1 (CONTROL)

The first example describes the preparation of a control fiber sample, i.e., a boron-doped SiC fiber which does not have a BN coating. Boron-doped SiC fibers were prepared using procedures described in U.S. patent application Ser. No. 08/683,475, U.S. Pat. No. 5,792,416 (Sacks et al.). Polycarbosilane (PCS) polymers with molecular weights of approximately 10,000 and 11,000 were synthesized by pressure pyrolysis of polydimethylsilane (PDMS) according to the procedure of Toreki et al. in U.S. Pat. No. 5,171,722. Polyvinylsilazane (PSZ) was prepared according to the procedures of Toreki et al. in U.S. Pat. No. 5,171,722 and in "Synthesis and Applications of a Vinylsilazane Preceramic Polymer," Ceram. Eng. Scd. Proc., 11 [9–10] 1371–1386 (1990). Polyvinylsiloxane (PSO) were prepared according to the same procedures as used for PSZ preparation, except that a siloxane monomer was used instead of a silazane monomer in the polymerization reaction. Solid boron hydride (SBH), dicumyl peroxide (DCP), and toluene were obtained commercially and used without any modification. Two separate spinning solutions were prepared with the same composition using the aforementioned PCS polymers with molecular weights of approximately 10,000 and 11,000. Each solution was prepared by mixing 9.0 mL toluene, 3.8 g PCS, 0.294 g of PSO, 0.042 g PSZ, 0.063 g SBH, and 4 mg DCP. The solutions were filtered and then concentrated by rotary evaporation to increase the viscosity until the solutions had solvent (toluene) concentrations in the range of approximately 30–35%. The concentrated polymer solutions were used to form "green" fibers by the conventional dry spinning method. The green fibers were heat treated according to the procedures in U.S. application Ser. No. 08/683,475 in order to pyrolytically decompose the organometallic precursor polymers (thereby forming a substantially SiC ceramic) and to subsequently densify the SiC fiber via sintering. Sintering heat treatments were carried out using a maximum temperature of approximately 1840–1845° C. for 12 minutes in a flowing argon atmosphere.

The fibers produced by the above method had an average tensile strength of approximately 2.8 GPa. Fiber tensile strengths were determined according to ASTM procedure D3379. The average fiber diameter was approximately 10 μm. The fibers contained approximately 1 wt % boron, as determined by neutron activation analysis. BSR tests were carried out using heat treatment at 1400° C. for 1 hour in an argon atmosphere. The average M value under these conditions was ~0.5.

As noted earlier, it is generally undesirable to sinter fibers at higher temperatures and/or longer times than required to achieve densification. This was demonstrated with the control (non-BN-coated) SiC fibers by carrying out heat treatment as follows. The fibers were initially heat treated in the same fashion as the sample described above. However, after heating at 1840° C. for 12 minutes in an argon atmosphere, the heat treatment was continued at this temperature for an additional 5 minutes and then the temperature was raised to 1940° C. while maintaining the argon atmosphere. The fibers were held at 1940° C. for 1 hr in the argon atmosphere and then the furnace was cooled to room temperature. The fibers had an average diameter of approximately 10 $\mu$m. The average tensile strength was approximately 2.1 GPa, i.e., a 25% decrease in tensile strength from the value obtained for the control fiber samples which were only heat treated at 1840–1845° C. for 12 minutes. (This result is essentially the same as reported in U.S. patent application Ser. No. 08/683, 475, U.S. Pat. No. 5,792,416.) The decrease in strength is attributed to grain growth. Transmission electron microscopy (TEM) observations showed that grains grow to a larger size when fibers were heat treated to temperatures above the sintering temperature.

Example 2

BN-coated samples were prepared using the same batches of green fibers that had been prepared for EXAMPLE 1. The green fibers were initially heat treated in the same way as the fibers prepared in EXAMPLE 1. Sintering was carried out at approximately 1840–1845° C. for 12 minutes in an argon atmosphere. However, after the 12 minute hold period, the flow of argon gas into the furnace was discontinued and the furnace was filled with nitrogen gas. A flowing atmosphere is maintained during all the heat treatment operations such that the gas entering into the furnace forces out the gas which is already within the furnace. Hence, the argon atmosphere was quickly replaced by a nitrogen gas atmosphere. The temperature was held at approximately 1840–1845° C. for an additional 5 minutes after the flow of argon gas into the furnace was discontinued and the flow of nitrogen into the furnace was started. The temperature was then increased to 1890° C. while maintaining the nitrogen atmosphere. The samples were held at 1890° C. for 10 minutes in the nitrogen atmosphere and then the furnace was cooled to room temperature.

The SiC fibers produced with BN coatings by the above method had essentially the same average tensile strength (within experimental error) as the control, uncoated, SiC fibers in EXAMPLE 1 which were sintered at 1840–1845° C. in argon for 12 minutes. The fibers heat treated in nitrogen at 1890° C. for 10 minutes had an average tensile strength of approximately 2.9 GPa and an average diameter of approximately 10 microns.

Example 3

Additional BN-coated SiC fiber samples were prepared using the same procedure as described above except that the heat treatment temperature was changed. Sintering was still carried out at approximately 1840–1845° C. for 12 minutes in an argon atmosphere. After the 12 minute hold period, the flow of argon gas into the furnace was discontinued and the furnace was filled with nitrogen gas. The temperature was held at approximately 1840–1845° C. for an additional 5 minutes after the flow of argon gas into the furnace was discontinued and the flow of nitrogen into the furnace was started. The temperature was then increased to 1940° C. while maintaining the nitrogen atmosphere. The samples were held at 1940° C. for I hr in the nitrogen atmosphere and then the furnace was cooled to room temperature.

The SiC fibers produced with BN coatings by the above method had essentially the same average tensile strength (within experimental error) as the control, uncoated, SiC fibers in EXAMPLE 1 which were sintered at 1840–1845° C. in argon for 12 minutes. The fibers heat treated in nitrogen at 1940° C. for 1 hour also had an average tensile strength of approximately 2.9 GPa and an average diameter of approximately 10 microns. However, the SiC fibers produced with BN coatings by the above method have greatly improved creep resistance, as indicated by BSR tests, compared to the control (uncoated) SiC fibers in EXAMPLE 1 which were sintered at 1840–1845° C. in argon for 12 minutes. The average M value obtained from a BSR test at 1400° C. (for 1 hour in argon) was ~0.9 for the sample heat treated at 1940° C. for 1 hour in a nitrogen atmosphere. This M value is similar (or slightly higher) than reported for relatively low-strength, powder-derived fibers (such as Carborundum SiC fibers produced by the method of Frechette et al.).

Figure 2:
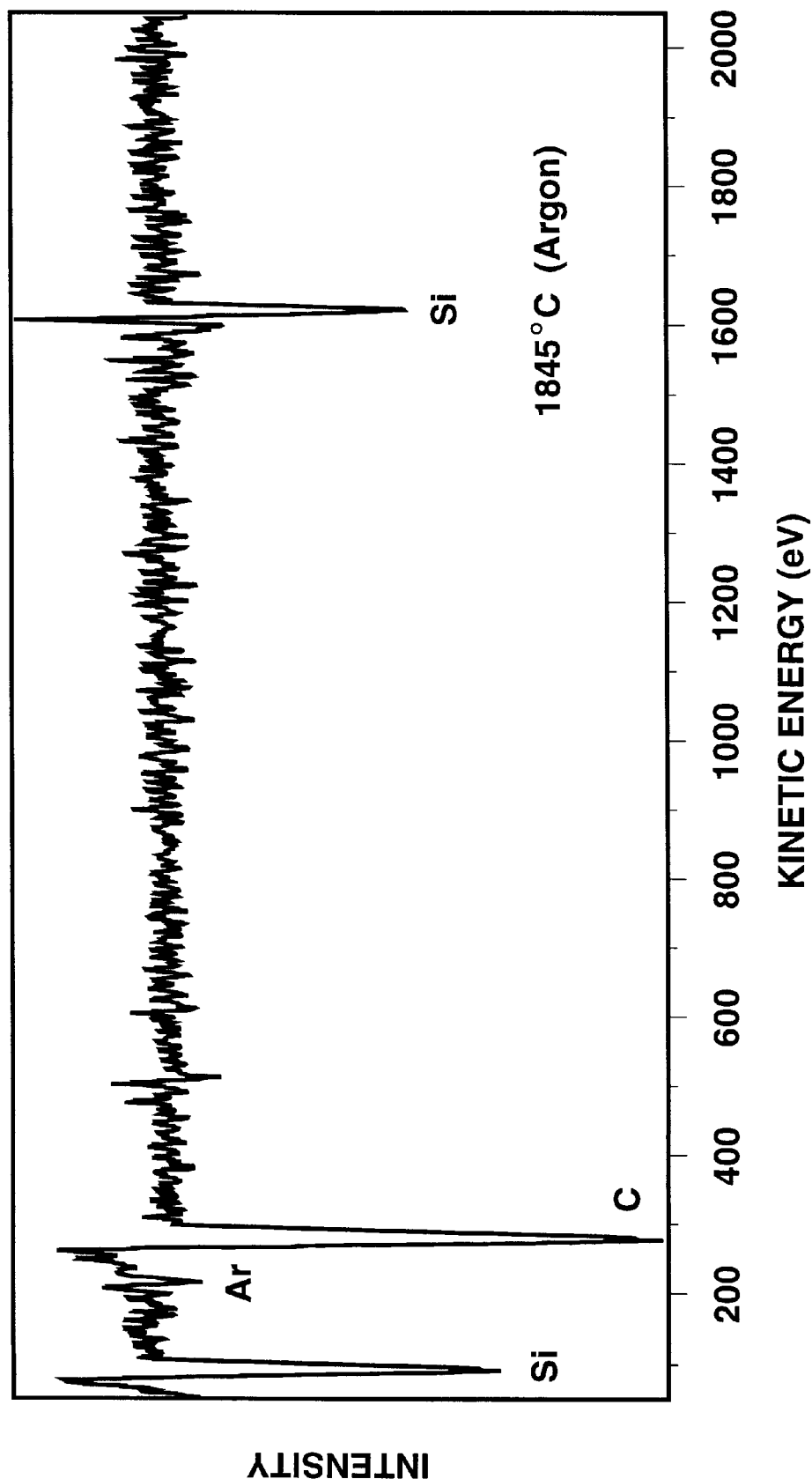
FIG. 2 shows the AES spectrum for the same control (uncoated) SiC fiber after it had been subjected to sputtering with argon in order to remove a thin layer of the SiC fiber surface.

The development of a BN coating on the SiC fibers heat treated in a nitrogen atmosphere was proven using two surface characterization techniques: X-ray photoelectron spectroscopy (XPS) analysis (also known as ESCA, electron spectroscopy for chemical analysis) and auger electron spectroscopy (AES). FIG. 1 shows an AES spectrum for the control (uncoated) SiC fiber sample from EXAMPLE 1 which was heat treated at 1845° C. for 12 minutes in argon. Carbon (C) is the major element observed in the spectrum. Some silicon (Si) and oxygen (O) peaks are also observed. The control sample has a thin carbon-rich layer. It is known from published studies that when silicon carbide is heat treated at high temperatures in inert or reducing atmospheres, some silicon tends to preferentially evaporate from the near surface region. In addition, there is a tendency for some extra carbon (so-called "adventitious" carbon) to contaminate the surface of samples during AES and XPS studies. The oxygen peak in the spectrum in FIG. 1 is also believed to be due surface contamination, probably coming from the mounting material (an adhesive) used to hold the fibers in place when the AES chamber was evacuated. This is believed because it is known from bulk chemical analyses that the overall oxygen content of the fibers is less than approximately 0.1 wt %. FIG. 2 shows the AES spectrum for the same control (uncoated) SiC fiber after it had been subjected to sputtering with argon in order to remove a thin layer of the SiC fiber surface. The spectrum now appears more representative of the bulk SiC fiber, i.e., the Si:C ratio is close to that of stoichiometric SiC. A small peak for argon is observed which comes from using argon for sputtering.

Figure 3:
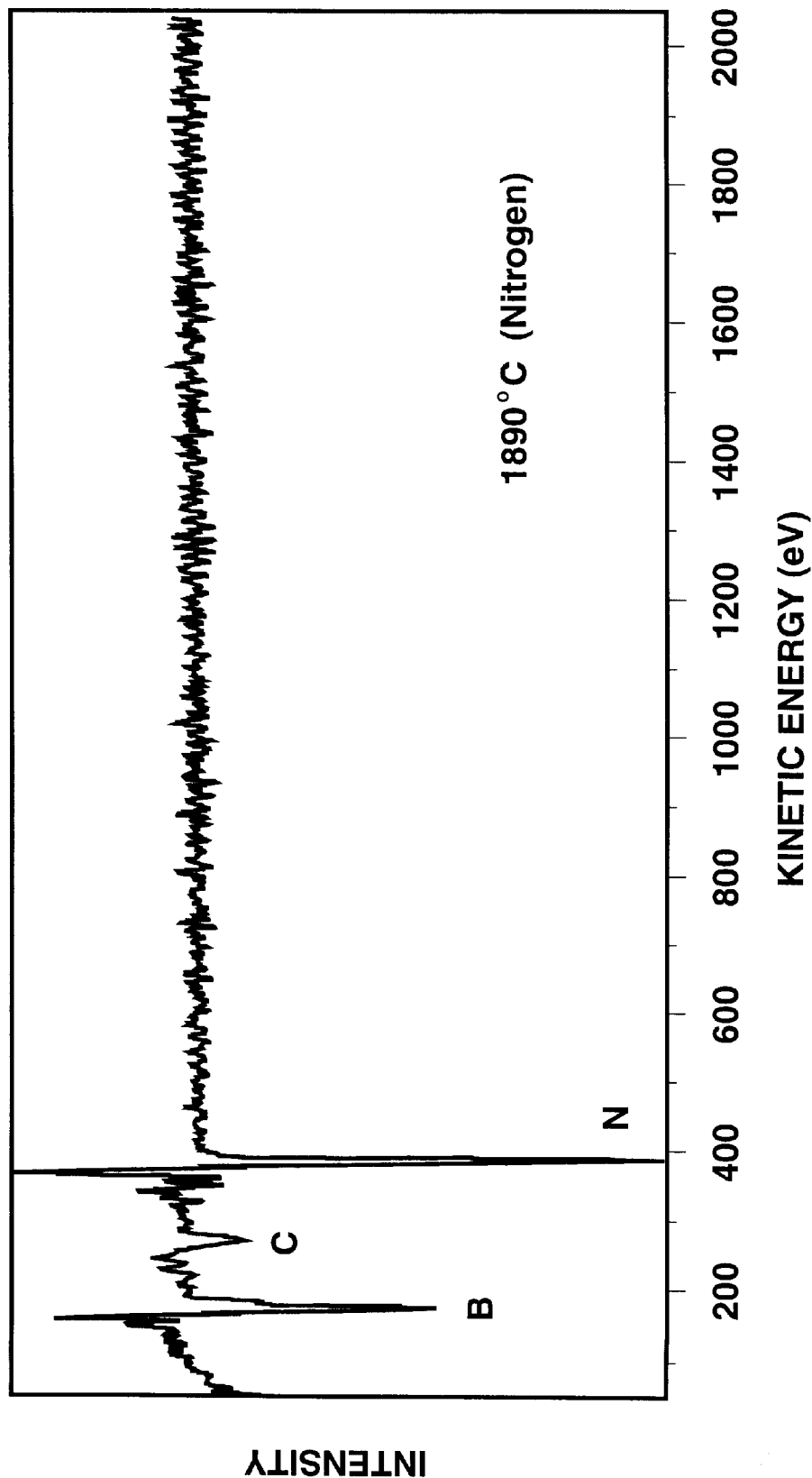
FIG. 3 shows the AES spectrum for the BN-coated SiC fiber of Example 2 prepared by heat treatment at 1890° C. in a nitrogen atmosphere.
Figure 4:
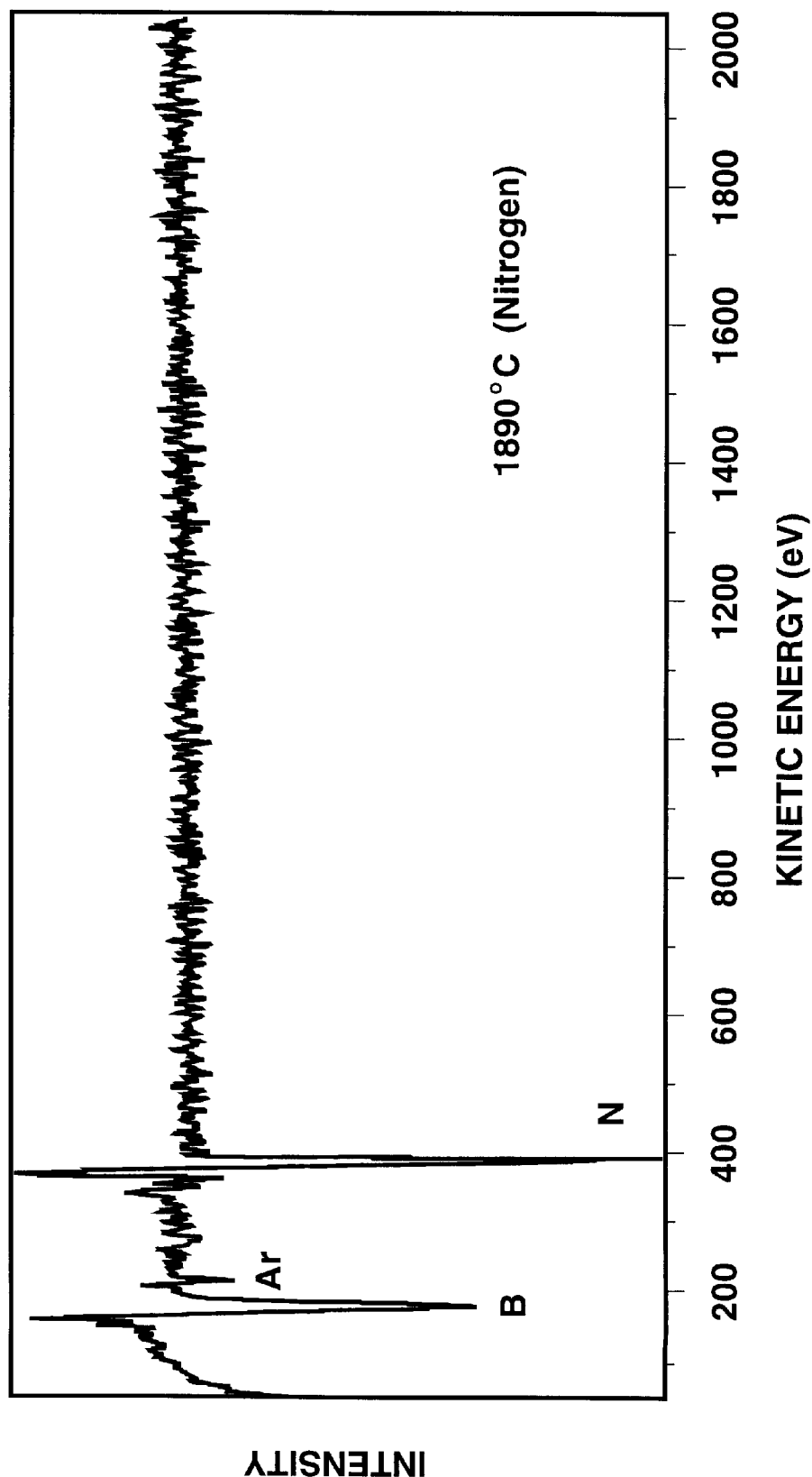
FIG. 4 shows the AES spectrum for the same BN-coated fiber after it had been subjected to sputtering with argon in order to remove a thin layer of the SIC fiber surface.

FIG. 3 shows the AES spectrum for the BN-coated SiC fiber of Example 2 prepared by heat treatment at 1890° C. in a nitrogen atmosphere. The major peaks observed are for B and N. A small peak is observed for carbon (C), but this might be due to adventitious carbon contamination. FIG. 4 shows the AES spectrum for the same BN-coated fiber after it had been subjected to sputtering with argon in order to remove a thin layer of the SiC fiber surface. The only significant peaks in the spectra are for B and N. A small peak for argon is observed which comes from using argon for sputtering.

Figure 5:
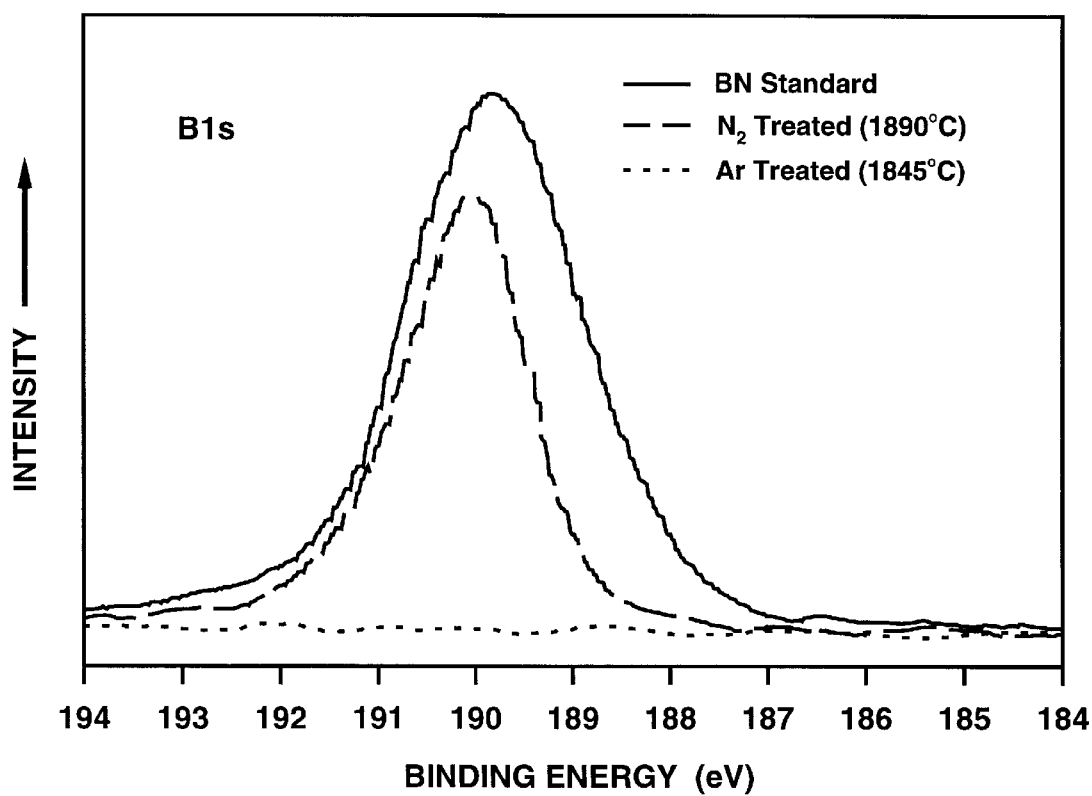
FIG. 5 shows XPS plots which compare the spectra, using greatly expanded x-axes in the regions for B, for the control SiC fiber of Example 1 which was heat treated at 1845° C. in argon, the BN-coated SiC fiber sample of Example 2 which was heat treated at 1890° C. in a nitrogen atmosphere, and a pure BN standard sample.
Figure 6:
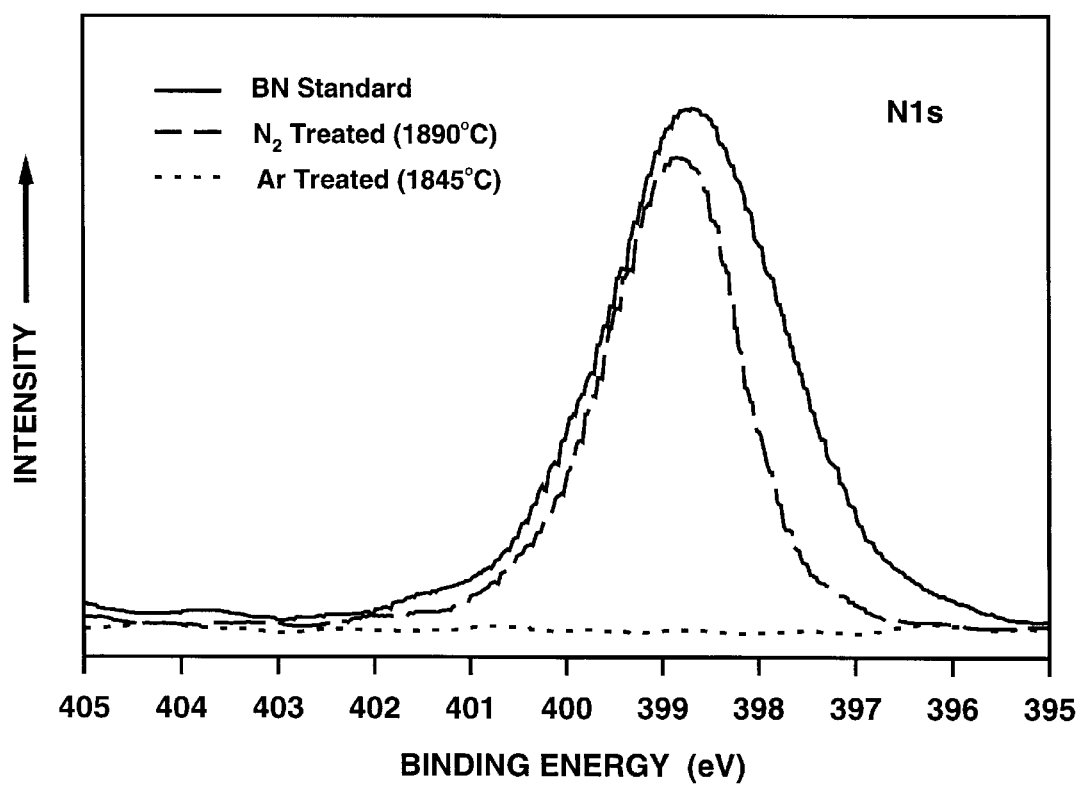
FIG. 6 shows XPS plots which compare the spectra, using greatly expanded x-axes in the regions for N, for the control SiC fiber of Example 1 which was heat treated at 1845° C. in argon, the BN-coated SiC fiber sample of Example 2 which was heat treated at 1890° C. in a nitrogen atmosphere, and a pure BN standard sample.

The locations of the B and N peaks in the coated SiC fiber sample of Example 2 heat treated at 1890° C. in nitrogen are consistent with the formation of the compound boron nitride (BN). This was shown by carrying out XPS on uncoated fibers, BN-coated fibers, and a pure BN standard. FIGS. 5 and 6 show XPS plots which compare the spectra using greatly expanded x-axes in the regions for B and N, respectively, for the control, uncoated, SiC fiber sample which was heat treated at 1845° C. in argon, the BN-coated SiC fiber sample which was heat treated at 1890° C. in a nitrogen atmosphere, and the pure BN standard sample. The binding energies for the B and N peaks for the 1890° C. (nitrogen heat-treated) sample are in extremely close agreement with the binding energies for the BN standard. This provides strong evidence that the coating developed on the SiC fibers is the compound BN. As expected, the control (uncoated) SiC fiber sample which was heat treated at 1845° C. in argon shows no peaks for B or N. This is consistent with the AES results in FIGS. 1 and 2 and shows that there is no BN present in the control sample.

Figure 7:
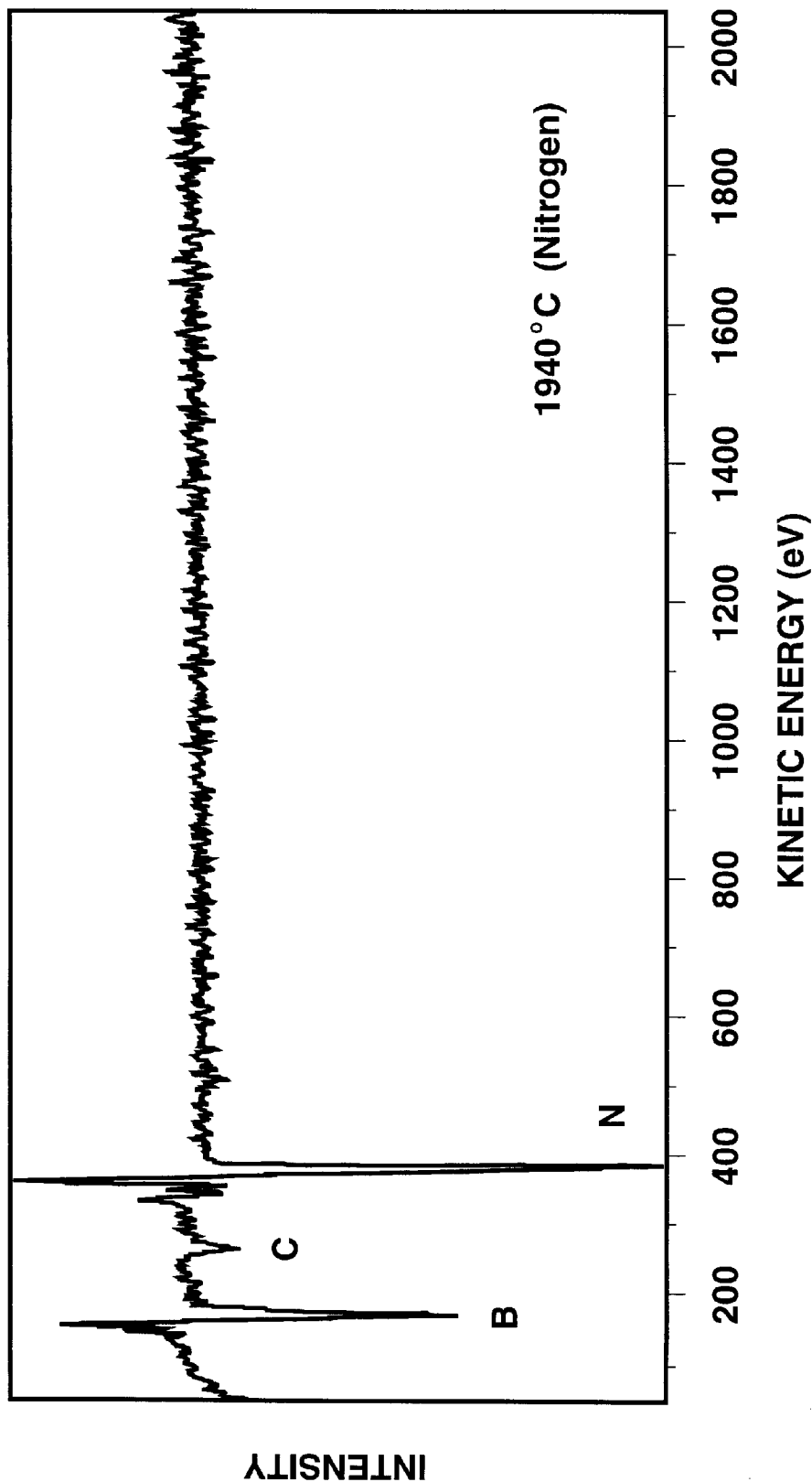
FIG. 7 shows the AES spectrum for the unsputtered surface for the BN-coated SiC fiber of Example 3 prepared by heat treatment at 1940° C. for 1 hour in a nitrogen atmosphere.

FIG. 7 shows the AES spectrum for the unsputtered surface for the BN-coated SiC fiber of Example 3 prepared by heat treatment at 1940° C. for 1 hour in a nitrogen atmosphere. The spectrum is essentially identical to the spectrum in FIG. 3 for the unsputtered surface for the BN-coated SiC fiber prepared by heat treatment at 1890° C. for 10 minutes in a nitrogen atmosphere. The major peaks observed are for B and N.

Example 4

The development of the BN coating on boron-doped SiC fibers generally requires heat treatment at a temperature higher than the temperature required for densification during sintering or it requires heat treatment for a much longer time than the time required for densification during sintering. This is demonstrated in the example given below in which an incomplete BN coating was developed when the temperature for heat treatment in nitrogen was not high enough above the sintering temperature for the length of treatment time.

Fibers were prepared using the same batches of green fibers that had been prepared for EXAMPLE 1. The green fibers were initially heat treated in the same way as the fibers prepared in EXAMPLE 1. Sintering was carried out at approximately 1840–1845° C. for 12 minutes in an argon atmosphere. After the 12 minute hold period, the flow of argon gas into the furnace was discontinued and the furnace was filled with nitrogen gas. The temperature was held at approximately 1840–1845° C. for an additional 5 minutes after the flow of argon gas into the furnace was discontinued and the flow of nitrogen into the furnace was started. The temperature was then increased to 1870° C. while maintaining the nitrogen atmosphere. The samples were held at 1870° C. for 10 minutes in the nitrogen atmosphere and then the furnace was cooled to room temperature.

The fibers heat treated in nitrogen at 1870° C. for 10 minutes had an average tensile strength of approximately 3.0 GPa and an average diameter of approximately 10 $\mu$m.

Figure 8:
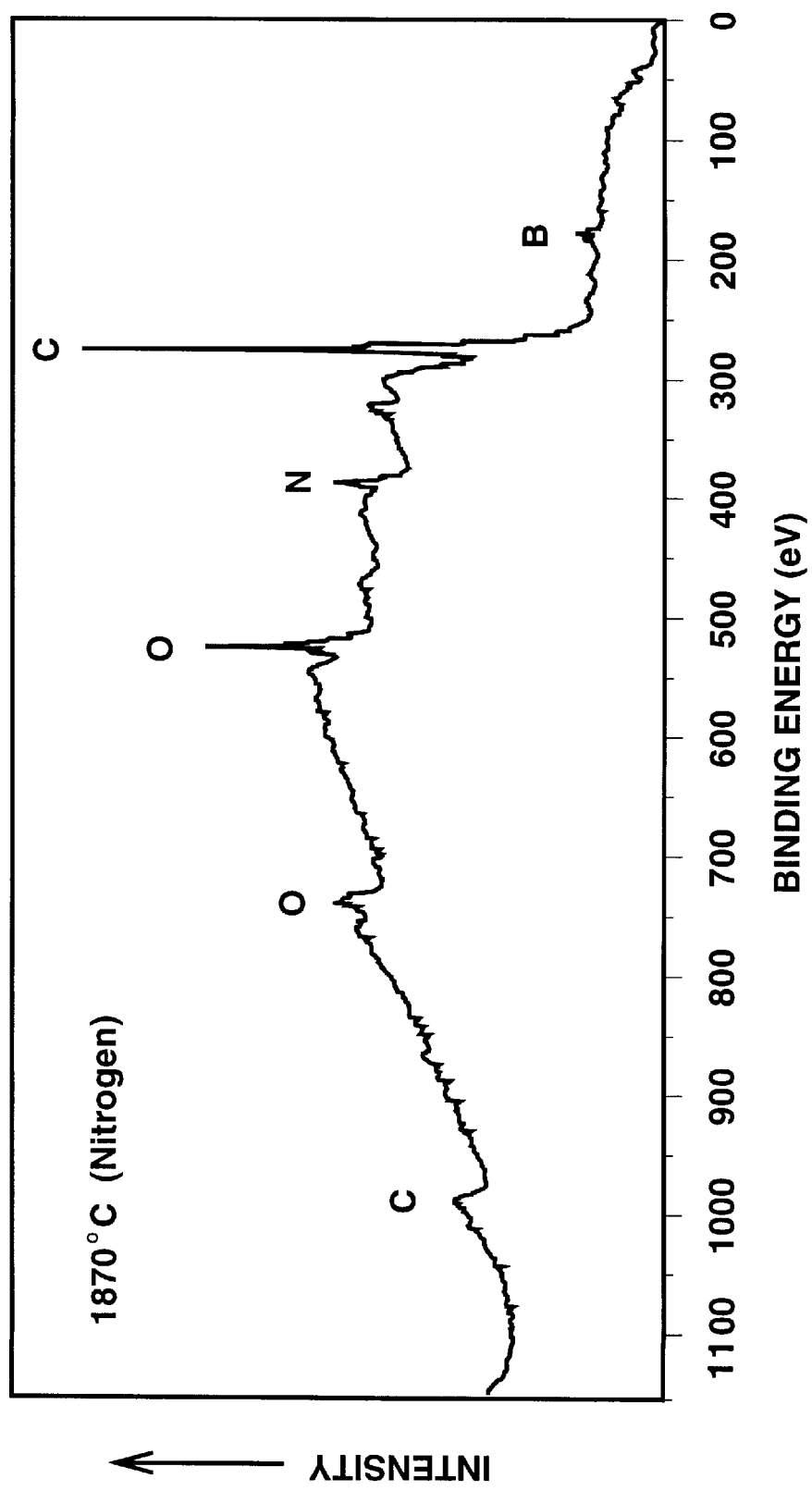
FIG. 8 shows the XPS spectra for the boron-doped SiC fiber sample of Example 4 heat treated in nitrogen at 1870° C.
Figure 9:
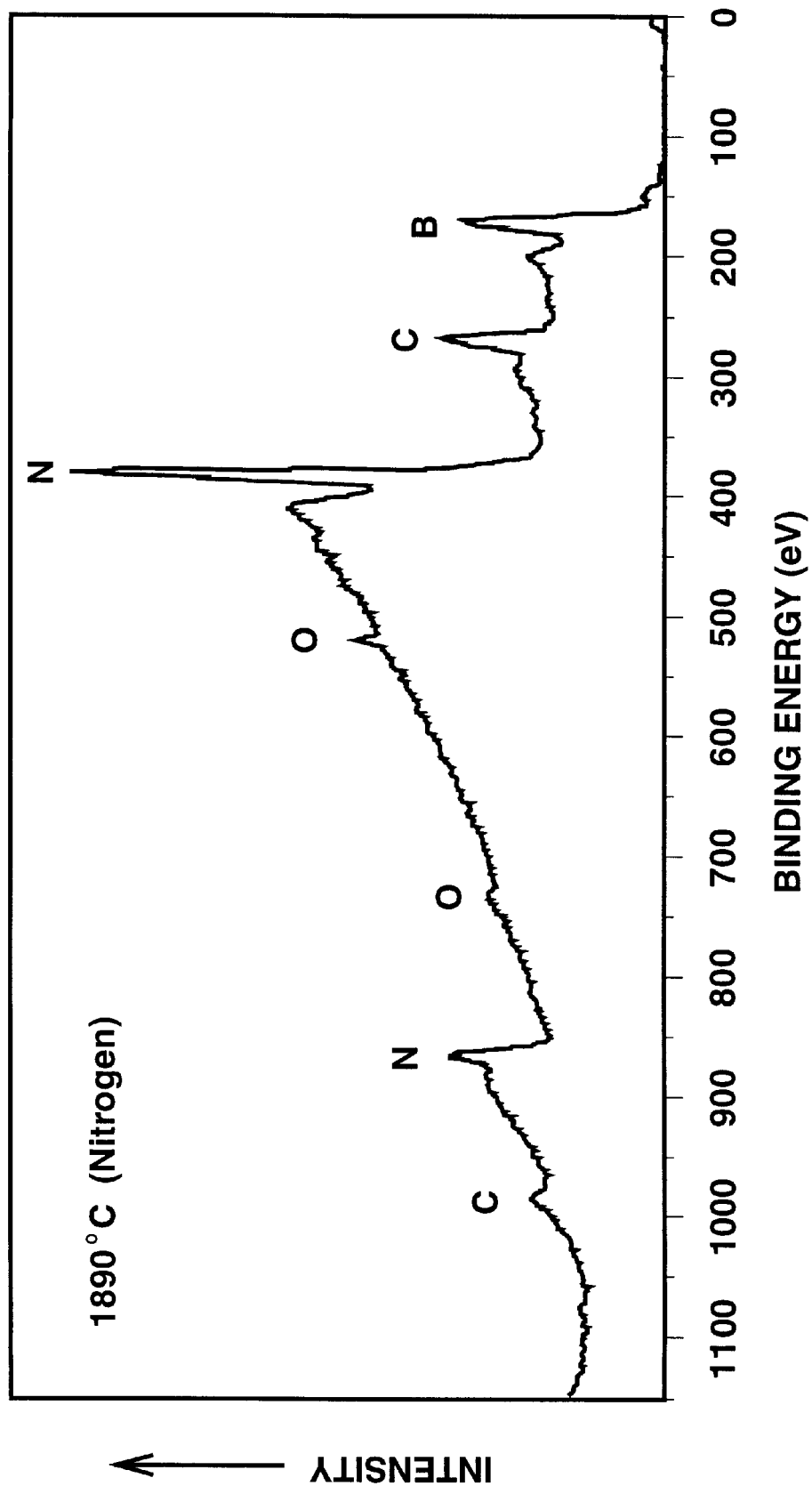
FIG. 9 shows the full XPS spectra for the boron-doped SiC fiber sample of Example 2 heat treated in nitrogen at 1890° C.

FIGS. 8 and 9 show a comparison of the XPS spectra for boron-doped SiC fiber samples heat treated in nitrogen at 1870° C. and 1890° C., respectively. (The latter figure is the complete spectrum obtained for the 1890° C. nitrogen heat-treated sample associated with FIGS. 6 and 7 in EXAMPLE 2. In FIGS. 6 and 7, only small regions of the spectra are shown.) It is evident that the B and N peaks in the fibers heat treated in nitrogen at 1870° C. are much less developed compared to the B and N peaks in the fibers heat treated in nitrogen at 1890° C. The spectrum for the 1870° C. samples shows that carbon is still the dominant element on the fiber surface. Hence, it is clear that heat treatment in 1870° C. in nitrogen over a short time period is insufficient to provide a complete BN coating on the SiC fibers.

Example 5

EXAMPLES 2 and 3 showed that BN-coated SiC fibers with high tensile strength are developed when the fibers are heat treated in nitrogen at a temperature above the sintering temperature. In contrast, this example shows that using a nitrogen atmosphere for the sintering densification stage, which has been practiced sometimes in the prior art, will not produce fibers with high tensile strength.

Fibers were prepared using the same batches of green fibers that had been prepared for EXAMPLE 1. The green fibers were heat treated in the same way as the fibers prepared in EXAMPLE 1 up through the initial pyrolysis, i.e., up to a heat treatment temperature of 1150° C. (which is sufficient to pyrolytically decompose the organosilicon polymer to an SiC-based ceramic). Above 1150° C., the fiber in this example was heat treated in a nitrogen atmosphere, instead of the argon atmosphere used in EXAMPLE 1. The fibers were first heat treated at approximately 1840–1845° C. for 12 minutes in the nitrogen atmosphere. After the 12 minute hold period, the temperature was increased to 1 870° C. while maintaining the nitrogen atmosphere. The samples were held at 1870° C. for 10 minutes in the nitrogen atmosphere and then the furnace was cooled to room temperature. The fibers heat treated in this manner had an average tensile strength of only 1.4 GPa. The average diameter of the fibers was approximately 11 $\mu$m.

The coating process is carried out on already sintered or densified boron-doped refractory carbide fibers or bodies (e.g., SiC, TiC, HfC, TaC, MoC, ZrC), either immediately after sintering or densification or at any subsequent time. The BN coating is produced by exposure of the fibers or bodies to a temperature at or above the normal sintering temperature in a nitrogen-containing atmosphere. The time of exposure necessary to produce a uniform BN coating is determined by several factors, the most dominant of which is the treatment temperature. The higher the treatment temperature, the more rapidly the BN coating is formed. Other factors include the percentage of nitrogen in the atmosphere and the percentage of boron in the fiber or body, with higher percentages resulting in shorter treatment times. Thus for example, it is most preferred that the treatment be carried out in 100% nitrogen. The BN coating can be formed at one atmosphere nitrogen or under varying pressures to alter the reaction rate. Of primary importance is the result that the treatment produces a BN coating without adversely affecting bulk properties such as tensile strength.

For SiC fibers as discussed in the examples, the BN coating can be produced within a wide range of temperatures, approximately 1750 to 2250 degrees C. Treatment temperatures in the lower range of 1750 to 1800 degrees C. would require at least many hours and up to days or weeks to produce uniform BN coatings—a fact which is probably impractical in a commercial sense. In contrast, treatment temperatures at the upper range of 2000 to 2250 degrees C. will require only minutes or seconds—which may be a desirable result if continuous processing is utilized.

In order to form the BN coating in a time roughly equal to or less than the sintering time for a given fiber, it is most preferred that the treatment temperature be approximately 50 to 150 degrees C. above the sintering temperature.

The explanation for the excellent strength retention in the SiC fibers with BN coatings produced under the methodology herein, even with processing occurring at elevated temperatures which would normally reduce strength due to grain growth, is not clearly understood. It is possible that the fiber strength is controlled by flaws at the surface. The surface flaws are probably smaller in size when the BN coating is formed on the surface. This is because the coating is smaller in thickness than the diameter of most of the SiC grains and/or because the BN grains in the coating are much smaller in size compared to the SiC grains. Another explanation may be that the heat treatment introduces compressive stresses on the surface, due possibly to the difference in thermal expansion coefficient between the BN coating on the surface region and the SiC interior of the fiber. Near surface compressive stresses might also develop if some nitrogen atoms become incorporated in the SiC lattice.

The illustrations set forth above are by way of example only, and the true scope and definition of the invention is to be as set forth in the following claims.

I claim:

1. A process for producing a boron nitride coating on a boron-doped, silicon carbide fiber, where said fiber has been previously sintered at a sintering temperature to densify said fiber, comprising the steps of exposing the fiber to an atmosphere consisting primarily of nitrogen gas, and elevating the temperature of the fiber to a treatment temperature at least equal to the sintering temperature for a period of time sufficient to develop a boron nitride coating on the fiber, where the tensile strength of said fiber having said boron nitride coating is approximately equal to the tensile strength of said fiber prior to production of said boron nitride coating.

2. The process of claim 1, where said densified fiber was sintered to produce a density of at least 3.0 grams per cubic centimeter.

3. The process of claim 1, where said treatment temperature is at least approximately 45 degrees C. above the sintering temperature.

4. The process of claim 1, where said atmosphere is 100 percent nitrogen ga.

5. The process of claim 1, further comprising the step of allowing said fiber to cool after sintering.

6. The process of claim 1, further comprising the step of maintaining said fiber at said sintering temperature until said temperature elevating step is initiated.

7. The process of claim 1, where said fiber was sintered in a non-nitrogen-containing atmosphere.

8. A process for producing a boron nitride coating on a sintered, boron-doped, silicon carbide body, where said body has been previously sintered at a sintering temperature to densify said body, comprising the steps of exposing said silicon carbide body to an atmosphere consisting primarily of nitrogen gas, and elevating the temperature of the silicon carbide body to a temperature at least equal to said sintering temperature for a period of time sufficient to develop a boron nitride coating on the body, where the tensile strength of said body having said boron nitride coating is approximately equal to the tensile strength of said body prior to production of said boron nitride coating.

9. The process of claim 8, where said elevated temperature is at least approximately 45 degrees C. above the sintering temperature.

10. The process of claim 8, where said atmosphere is 100 percent nitrogen gas.

11. The process of claim 8, further comprising the step of allowing said silicon carbide body to cool after said sintering step.

12. The process of claim 8, further comprising the step of maintaining said silicon carbide body at said sintering temperature until said temperature elevating step is initiated.

13. The process of claim 8, where said sintering step is carried out in a non-nitrogen-containing atmosphere.

14. The process of claim 8, where the sintering step is carried out at a temperature sufficient to produce said densified body with a density of at least 3.0 grams per cubic centimeter.

15. A process for producing a boron nitride coating on a boron-doped, refractory carbide body, where said body has been previously heat treated at an elevated temperature to densify said body, comprising the steps of exposing the densified body to an atmosphere consisting primarily of nitrogen gas, and elevating the temperature of the body to a treatment temperature at least equal to the densification temperature for a period of time sufficient to develop a boron nitride coating on the body, where the tensile strength of said body having said boron nitride coating is approximately equal to the tensile strength of said body prior to production of said boron nitride coating.

16. The process of claim 15, where said treatment temperature is at least approximately 45 degrees C. above the densification temperature.

17. The process of claim 15, where said atmosphere is 100 percent nitrogen gas.

18. The process of claim 15, further comprising the step of allowing said refractory carbide body to cool after said densification step.

19. The process of claim 15, further comprising the step of maintaining said refractory carbide body at said densification temperature until said temperature elevating step is initiated.

20. The process of claim 15, where said densification step is carried out in a non-nitrogen-containing atmosphere.

21. A process for producing a boron nitride coating on a boron-doped, silicon carbide fiber, comprising the steps of exposing the fiber to an atmosphere consisting primarily of nitrogen gas, and maintaining the fiber at a treatment temperature sufficient to develop a boron nitride coating on the fiber, where the tensile strength of said fiber having said boron nitride coating is approximately equal to the tensile strength of said fiber prior to production of said boron nitride coating.

22. The process of claim 21, where said fiber is maintained at a treatment temperature of between approximately 1750 to 2250 degrees C.

23. A process for producing a boron nitride coating on a boron-doped, refractory carbide body, comprising the steps of exposing the body to an atmosphere consisting primarily of nitrogen gas, and maintaining the body at a treatment temperature sufficient to develop a boron nitride coating on the body, where the tensile strength of said body having said boron nitride coating is approximately equal to the tensile strength of said body prior to production of said boron nitride coating.

24. The process of claim 23, where said body is maintained at a treatment temperature of between approximately 1750 to 2250 degrees C.

* * * * *